United States Patent [19]

Uchibori

[11] Patent Number: 5,083,567
[45] Date of Patent: Jan. 28, 1992

[54] METHOD AND SYSTEM FOR CONTROLLING ULTRASOUND SCAN SEQUENCE IN DOPPLER SIGNAL DETECTION

[75] Inventor: Takanobu Uchibori, Ootawara, Japan

[73] Assignee: Kabushiki Kaisha Toshiba, Kawasaki, Japan

[21] Appl. No.: 526,896

[22] Filed: May 22, 1990

[30] Foreign Application Priority Data

May 23, 1989 [JP] Japan .................................. 1-129340

[51] Int. Cl.⁵ .................................................. A61B 8/00
[52] U.S. Cl. ............................. 128/661.09; 73/861.25
[58] Field of Search ..................... 128/661.08–661.10, 128/660.05; 73/861.25

[56] References Cited

U.S. PATENT DOCUMENTS

4,918,605 4/1990 Shirasaka ................... 128/661.09 X
4,991,589 2/1991 Hongo et al. ................... 128/661.09
5,014,710 5/1991 Maslak et al. ............... 128/661.09 X

*Primary Examiner*—Francis Jaworski
*Attorney, Agent, or Firm*—Finnegan, Henderson, Farabow, Garrett, and Dunner

[57] ABSTRACT

In an ultrasound diagnosis apparatus, two reception data in two scan directions formed between ultrasound transmission and reception directions can be acquired upon simultaneous reception. The reception data are acquired by sequentially shifting the transmission direction. When the reception data in a predetermined scan direction is obtained, Doppler shift amounts are calculated upon acquisition of a predetermined number of reception data in the predetermined direction. In this case, ultrasound transmission and reception operations are so controlled as to acquire the Doppler shift amounts in each direction every predetermined time interval.

9 Claims, 6 Drawing Sheets

METHOD AND SYSTEM FOR CONTROLLING ULTRASOUND SCAN SEQUENCE IN DOPPLER SIGNAL DETECTION

BACKGROUND OF THE INVENTION

1. Field of the Invention

The present invention relates to a method and system for controlling an ultrasound scan sequence in Doppler signal detection.

2. Description of the Related Art

An ultrasound blood flow imaging apparatus employing an ultrasound Doppler method and a pulse reflection method is known to color-display, in real time, both blood flow and tomographic images of a subject acquired by an ultrasound probe. The principle of measurement of a blood flow velocity in the apparatus will be described below.

When an ultrasound beam is transmitted to blood flowing in a subject such as a living body, a center frequency fc of the ultrasound beam is Doppler-shifted by blood cells and is changed by a Doppler frequency fd. The frequency f of an ultrasound beam to be received is given as $$f = fc + fd$$

$$\text{for } fd = 2v\cos\theta \cdot fc/c$$

where v is the blood flow velocity, $\theta$ is the angle defined between an ultrasound beam transmission direction and a blood vessel direction, and c is the sound velocity. Therefore, the blood flow velocity v can be obtained upon detection of the Doppler frequency fd.

Figure 1:
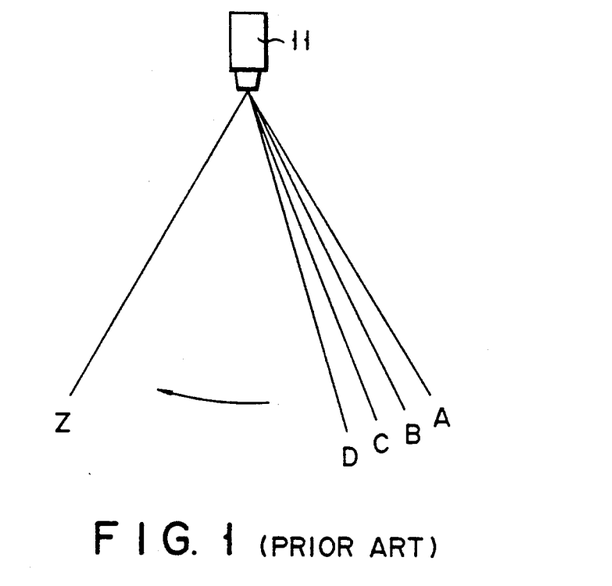
FIG. 1 is a schematic view showing a sector scan.
Figure 2:
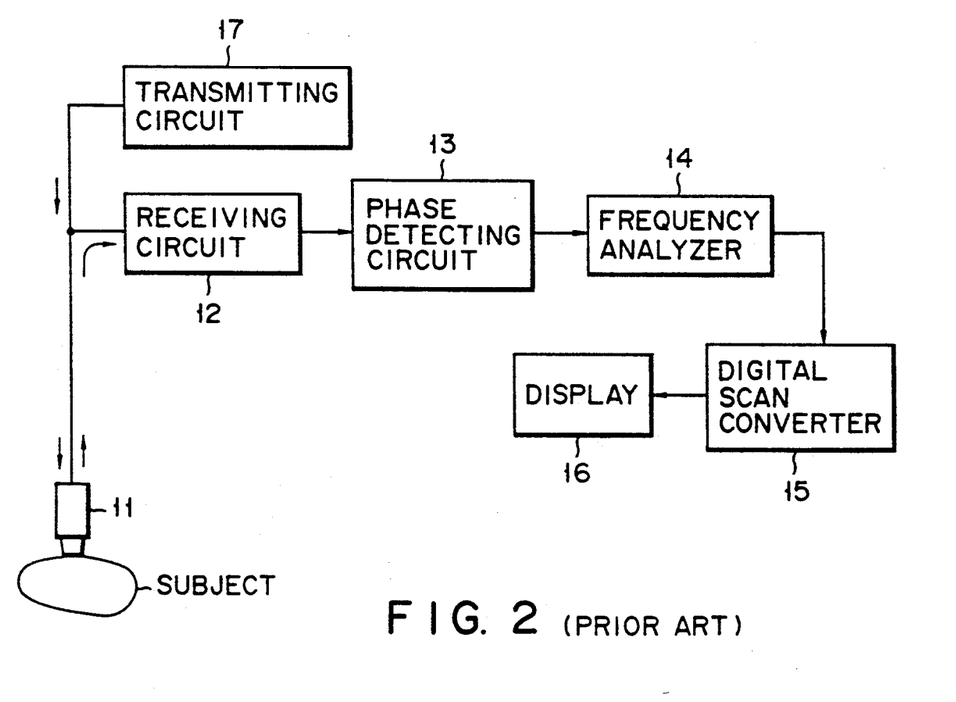
FIG. 2 is a block diagram showing an arrangement of an ultrasound diagnosis apparatus.

A two-dimensional image of the blood flow velocity v is displayed as follows. As shown in FIGS. 1 and 2, ultrasound beams are sequentially transmitted from an ultrasound probe 11 to a subject in scan directions A, B, C, D,... Z in response to pulse signals output from a transmitting circuit 17, and a sector scan is performed.

When an ultrasound beam is transmitted in the scan direction A, the center frequency of the ultrasound beam is Doppler-shifted by a blood flow in the subject. Echo signals reflected from the subject are received by the ultrasound probe 11 and are converted into electrical signals. These electrical signals are input to a receiving circuit 12.

A phase detecting circuit 13 detects a Doppler signal from the echo signal. This Doppler signal is detected at, e.g., 256 sample points set in each scan direction. The Doppler signal detected at each sample point is frequency-analyzed by a frequency analyzer 14 and is input to a display 16 through a digital scan converter (DSC) 15. Therefore, blood flow information in the scan direction A can be displayed on the display 16 in real time.

The same operations as described above are repeated in other scan directions B, C, D,... Z, and a blood flow velocity distribution image can be displayed based on the obtained Doppler signals.

A scan time tf required for obtaining one image is represented as follows:

$$tf = n \cdot N / fr$$

where n is the scan count of each scan line, N is the number of scan lines, and fr is the ultrasound beam transmission frequency. For example, if n=8, N=16, and fr=4 kHz, then tf=8×16/4000=32 ms.

Display precision of the blood flow image is determined by the number of frames, the number of scan lines, and a field angle (in case of sector scan). It is, however, difficult to simultaneously optimize these parameters. For example, when the number of frames is increased to suppress flickering of a blood flow image to be displayed, the number of scan lines and the field angle are reduced. When the number of scan lines is increased to improve an image resolution, the field angle is reduced. When the field angle is increased to widen the scan range, the number of frames and the number of scan lines are reduced.

The above problems occur when the scan count of each scan line is maximized to detect blood flow information as precise as possible. When the scan count is reduced, the number of frames, the number of scan lines, and the field angle are increased. When the scan count is very small, however, a frequency analysis error is increased.

A method of simultaneously receiving a plurality of different echo signals is employed to optimally set the number of frames, the number of scan lines, and the field angle. According to this method, since echo signals from a subject are simultaneously received, a plurality of echo signals can be simultaneously received by one transmission of ultrasound beams. For example, when two echo signals are simultaneously received, two images can be acquired within the conventional image acquisition time. When the number of frames and the field angle are equal to those of a conventional system, the scan line interval can be halved. In addition, when the scan line interval is equal to that of the conventional system, the field angle can be doubled.

According to this method, a difference between data acquisition times of two scan lines upon one transmission of an ultrasound beam in a predetermined direction is zero. However, a difference Di in data acquisition times of two scan lines upon one transmission of an ultrasound beam in the next direction and those in the predetermined direction occurs. Therefore, the data acquisition time differences between scan lines are given as 0, Di, 0, Di, ... and cannot be constant.

Figure 3:
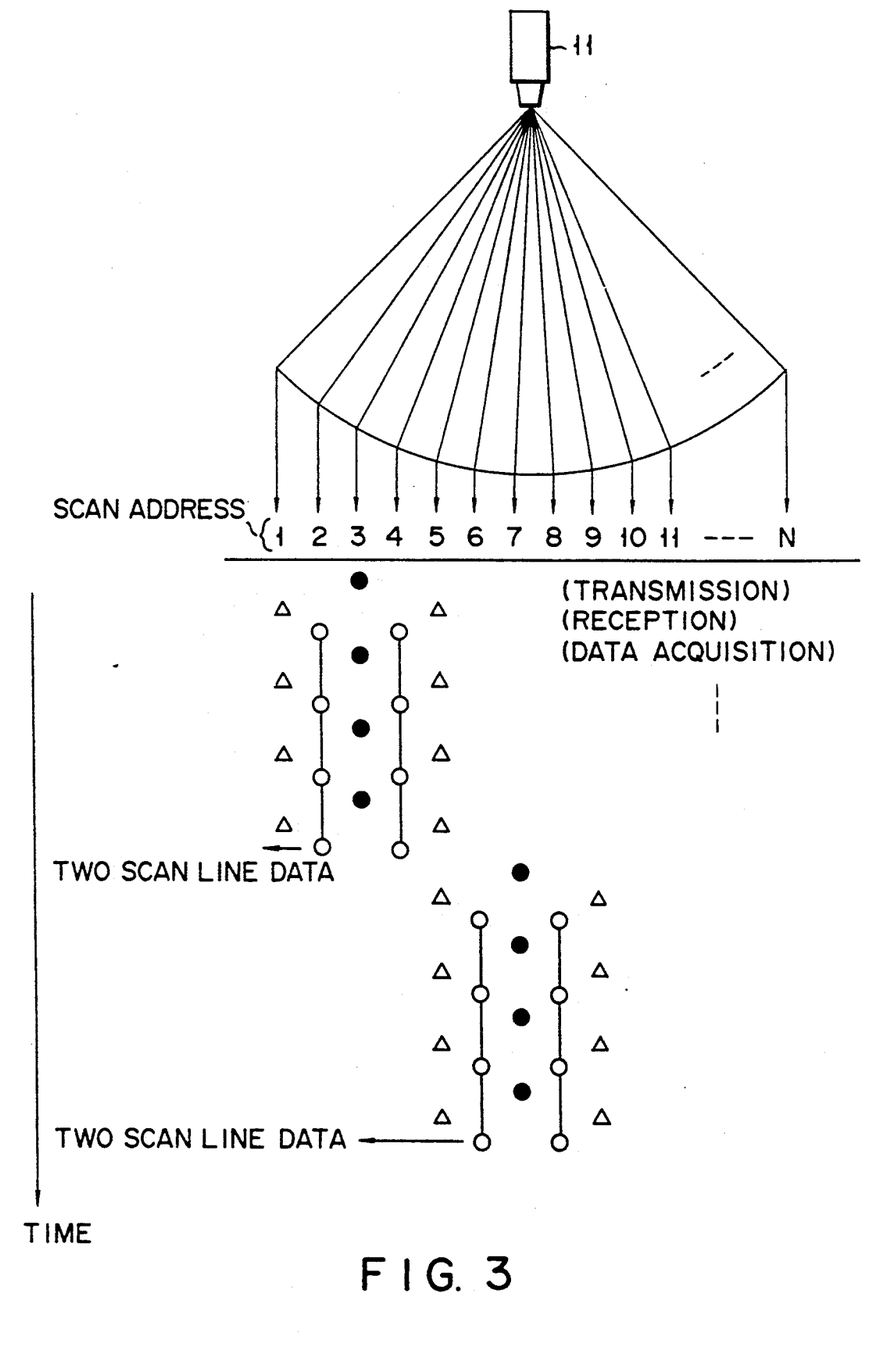
FIG. 3 is a view showing an ultrasound scan sequence for simultaneous reception.

A data acquisition time difference between scan lines will be described with reference to an ultrasound scan sequence (scan count on one scan line is 4) for simultaneous reception in two directions, as shown in FIG. 3.

An ultrasound beam is transmitted from the ultrasound probe 11 at scan address 3 (●), and ultrasound beams from the subject are simultaneously received at scan addresses 1 (△) and 5 (△), thereby obtaining reception data at scan addresses 2 (○) and 4 (○). This operation is repeated four times to obtain four reception data at each of scan addresses 2 and 4, and two display scan lines for the image display are formed.

An ultrasound beam is transmitted from the ultrasound probe 11 at scan address 7 (●), and ultrasound beams from the subject are simultaneously received at scan addresses 5 (△) and 9 (△), thereby obtaining reception data at each of scan addresses 6 (○) and 8 (○). This operation is repeated four times to obtain four reception data at each of scan addresses 6 and 8, and two display scan lines for the image display are formed.

As can be apparent from the above description, although a data acquisition time difference between the display scan lines at scan addresses 2 and 4 is zero, that at scan addresses 4 and 6 corresponds to four transmission/reception periods. As described above, the data acquisition time differences between the display scan lines cannot be given to be constant. This indicates that scan is performed at irregular intervals, and a highly precise blood flow velocity distribution image cannot be obtained.

Under the above circumstances, a strong demand has arisen for an ultrasound diagnosis apparatus which can display a flow velocity distribution image by constant data acquisition times between scan lines using a method for a plural simultaneous reception.

SUMMARY OF THE INVENTION

It is an object of the present invention to provide a method and system for controlling an ultrasound scan sequence in a Doppler signal detection.

According to one aspect of the present invention, there is provided a method for controlling an ultrasound scan sequence in a Doppler signal detection, the method comprising the steps of:

transmitting a first ultrasound beam to a first transmission direction in a subject;

receiving first echo signals from a plurality of first reception directions at the same time, each of the first echo signals being received from each of the first reception directions;

obtaining first echo data in a plurality of first scan directions from the received first echo signals, each of the first scan directions being between the first transmission direction and each of the first reception directions;

transmitting a second ultrasound beam to a second transmission direction in the subject;

receiving second echo signals from a plurality of second reception directions at the same time, each of the second echo signals being received from each of the second reception directions;

obtaining second echo data in a plurality of second scan directions from the received second echo signals, each of the second scan directions being between the second transmission direction and each of the second reception directions;

selecting third echo data in one of the first scan directions and fourth echo data in one of the second scan directions corresponding to the one of the first scan directions; and acquiring Doppler data from the selected third and forth echo data.

According to one aspect of the present invention, there is provided a system for controlling an ultrasound scan sequence in a Doppler signal detection, the system comprising:

transmitting and receiving means for transmitting a plurality of ultrasound beams to a plurality of transmission directions, and receiving a plurality of echo signals from a plurality of reception directions corresponding to each of the transmission directions at the same time, each of the echo signals being received from each of the reception directions;

data acquiring means for obtaining a plurality of echo data in a plurality of scan directions from the received echo signals by each of the transmission directions, each of the scan directions being between each of the transmission directions and each of the reception directions, acquiring first Doppler data in one of the scan directions corresponding to one of the transmission directions and second Doppler data in the one of the scan directions corresponding to one of the transmission directions outside the one of the transmission directions, and averaging the first and second Doppler data; and controlling means for controlling the transmitting and receiving means and the data acquiring means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Preferred embodiments of the present invention will be described with reference to the accompanying drawings.

Figure 4A:
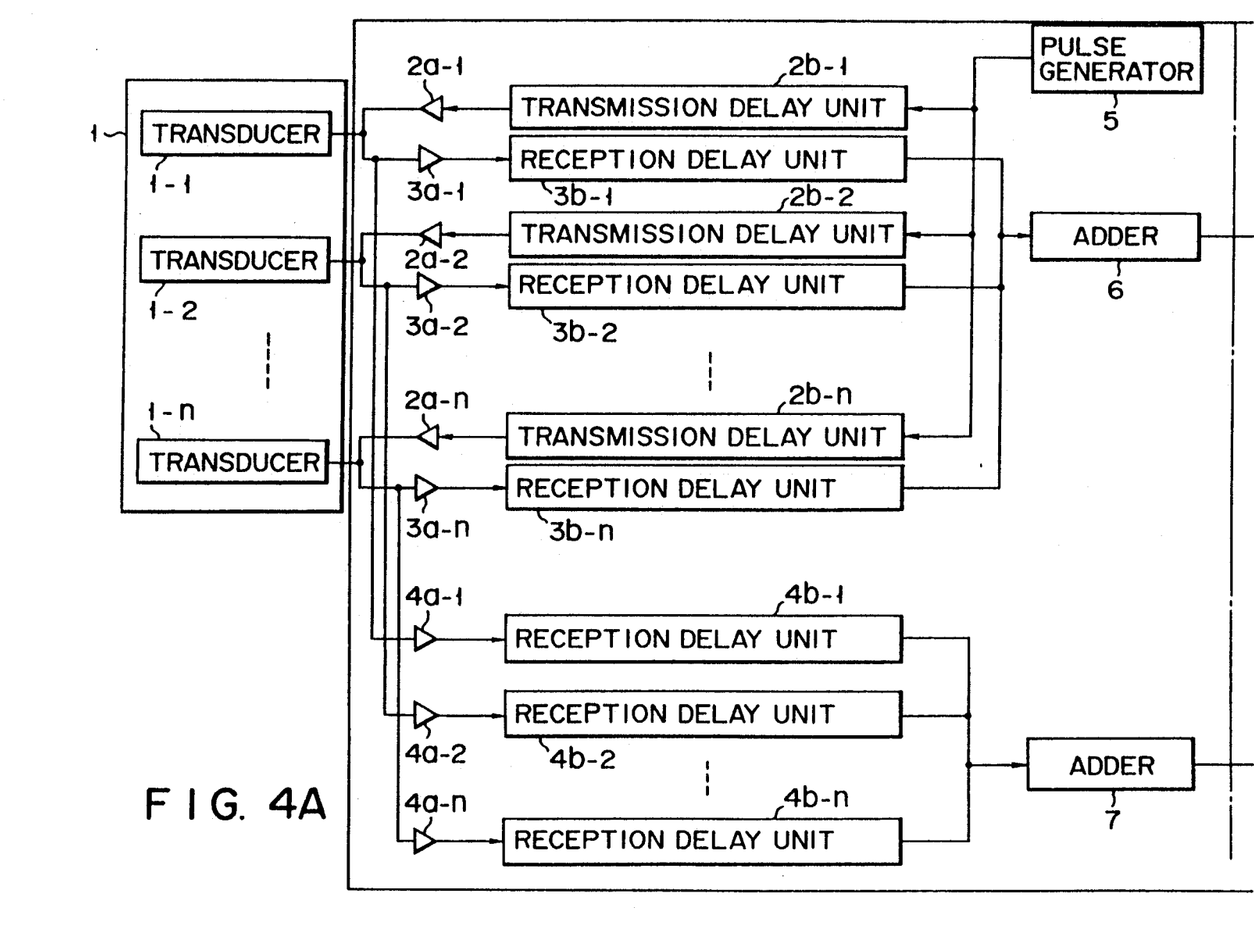
FIGS. 4A and 4B are block diagrams showing a system according to the present invention.
Figure 4B:
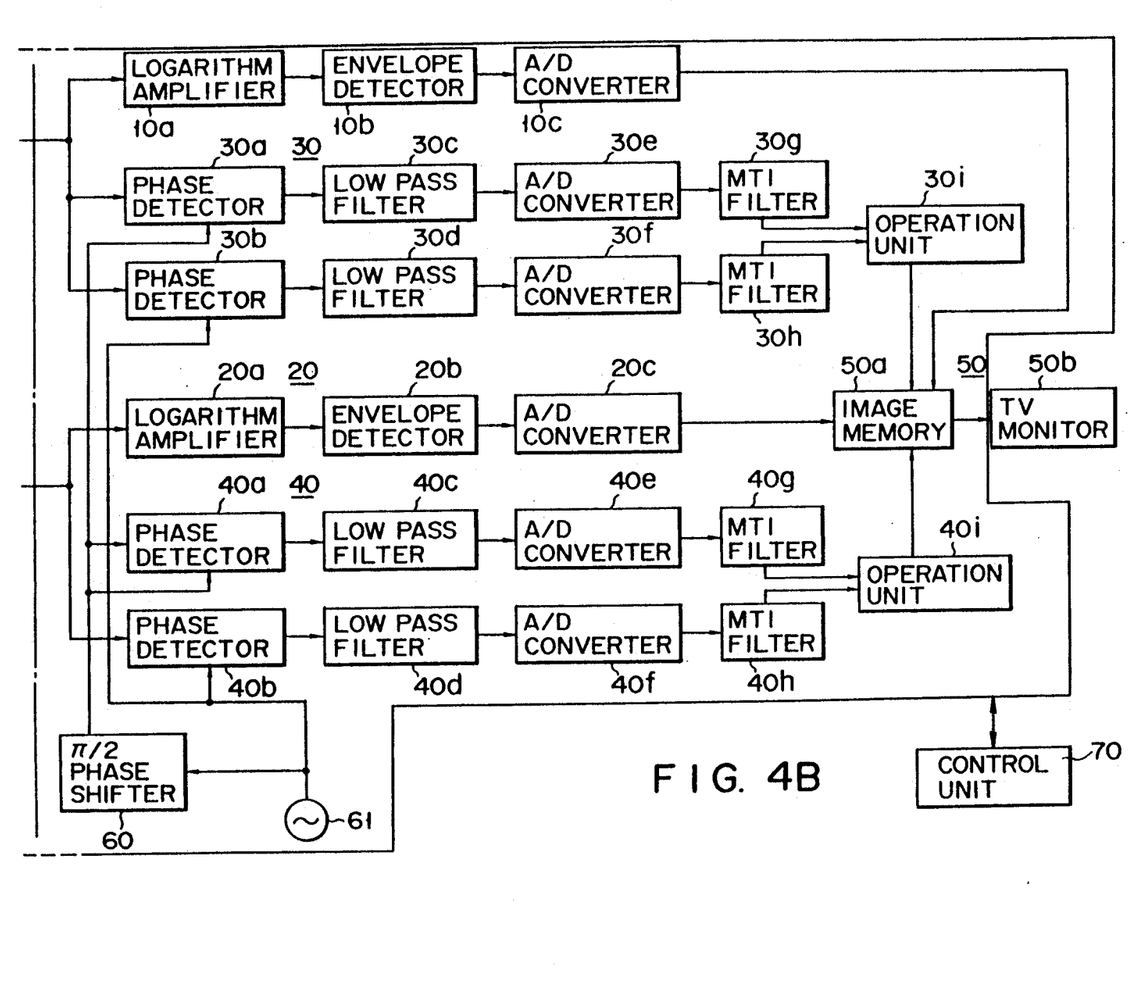

Referring to FIGS. 4A and 4B, a system according to an embodiment comprises an ultrasound probe 1 having transducers 1-1 to 1-n, pulsers 2a-1 to 2a-n, transmission delay units 2b-1 to 2b-n, preamplifiers 3a-1 to 3a-n and 4a-1 to 4a-n, reception delay units 3b-1 to 3b-n and 4b-1 to 4b -n, a pulse generator 5, adders 6 and 7, B mode (tomographic image display mode) processing units 10 and 20, D mode (Doppler image display mode) processing units 30 and 40, a display unit 50, a $\pi/2$ phase shifter 60, and an oscillator 61.

The pulse generator 5 generates repetition pulse signals for determining ultrasound beam transmission intervals.

The transmission delay units 2b-1 to 2b-n give predetermined delay times determined on the basis of a focusing point and a transmission direction of an ultrasound beam to generated repetition pulse signals.

The pulsers 2a-1 to 2a-n generate drive pulse signals for driving the transducers 1-1 to 1-n.

The transducers 1-1 to 1-n transmit and receive ultrasound beams. That is, ultrasound waves from predetermined observation points upon transmission of ultrasound beams are received as echo signals.

The reception delay units 3b-1 to 3b-n and 4b-1 to 4b-n give delay times almost equal to the delay times given by the transmission delay units 2b-1 to 2b-n to the echo signals from the preamplifiers 3a-1 to 3a-n and 4a-1 to 4a-n. The given delay times are different from each other.

The address 6 and 7 add signals output from the reception delay units 3b-1 to 3b-n and 4b-1 to 4b-n. Signals output from the adders 6 and 7 are input to the B mode (tomographic image display mode) processing units 10 and 20, and the D mode (Doppler image display mode) processing units 30 and 40.

The B mode processing unit 10 comprises a logarithm amplifier 10a, an envelope detector 10b, and an A/D (analog/digital) converter 10c. The B mode processing unit 20 comprises a logarithm amplifier 20a, an envelope detector 20b, and an A/D converter 20c.

The D mode processing unit 30 comprises phase detectors 30a and 30b, low-pass filters 30c and 30d, A/D converters 30e and 30f, MTI (moving target indicator) filters 30g and 30h, and an operation unit 30i. The D mode processing unit 40 comprises phase detectors 40a and 40b, low-pass filters 40c and 40d, A/D converters unit 40i. The MTI filters 30g, 30h, 40g, and 40h comprise buffer memories (not shown), respectively. Each of the operation units 30i and 40i comprises a buffer memory (not shown), an adder (not shown), and a frequency analyzer (not shown).

The display unit 50 comprises an image memory 50a and a TV monitor 50b and displays a tomographic image and a Doppler image.

An operation of the system having the arrangement described above will be described below.

Ultrasound beams are transmitted in predetermined directions by the pulsers 2a-1 to 2a-n connected to the transducers 1-1 to 1-n constituting the ultrasound probe 1. Ultrasound beams reflected from the subject are received as echo signals by the transducers 1-1 to 1-n. The received echo signals are delayed by the reception delay circuits 3b-1 to 3b-n and 4b-1 to 4b-n by predetermined different delay times, and the delayed signals are added by the adders 6 and 7. That is, echo signals can be acquired from the two different directions. The acquired echo signals are processed by the B mode processing units 10 and 20 and the D mode processing units 30 and 40. An ultrasound image reconstructed on the basis of the processed echo signals is displayed on the TV monitor 50b of the display unit 50. Flow velocity are calculated by the operation units 30i and 40i in the D mode processing units 30 and 40 on the basis of a plurality of echo signals received from a single portion of the subject.

Figure 5:
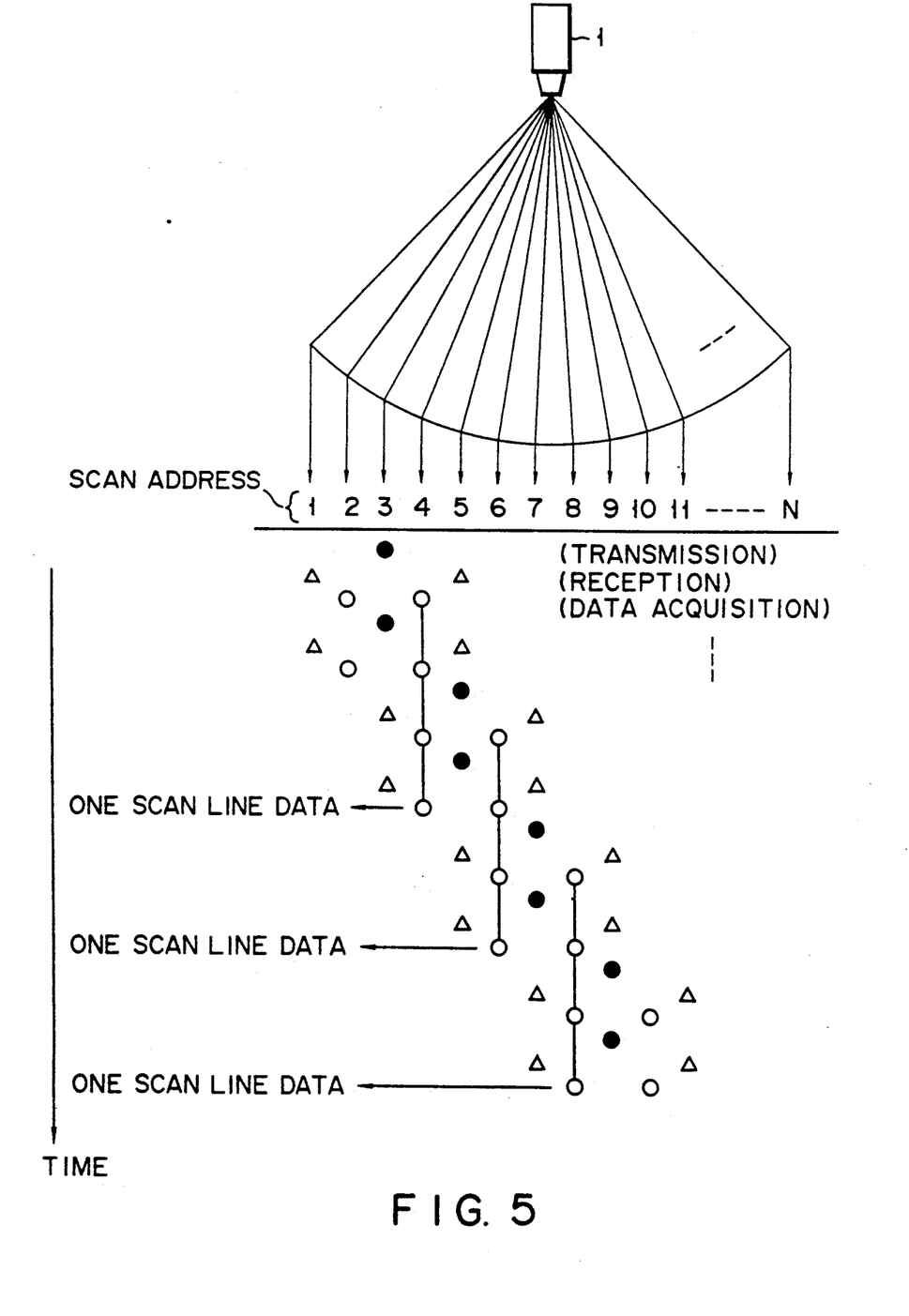
FIG. 5 is a view showing a scan sequence according to the first embodiment of the present invention.

An ultrasound sector scan sequence (ultrasound beam reception operation) as the first embodiment of the present invention will be described with reference to FIG. 5. Scan lines are formed between the transmission and reception lines of the ultrasound beam. One scan line is constituted by four reception data.

An ultrasound beam is transmitted from the ultrasound probe 1 at scan address 3 ( ), and ultrasound beams are simultaneously received from the subject at scan addresses 1 (Δ) and 5 (Δ), thereby obtaining reception data at scan addresses 2 (◯) and 4 (◯). This operation is repeated twice, and two reception data at each of scan addresses 2 and 4 are acquired.

An ultrasound beam is transmitted from the ultrasound probe 1 at scan address 5 ( ), and ultrasound beams are simultaneously received from the subject at scan addresses 3 (Δ) and 7 (Δ), thereby obtaining reception data at scan addresses 4 (◯) and 6 (◯). This operation is repeated twice, and two reception data at each of scan addresses 4 (◯) and 6 (◯) are acquired. At this time, a Doppler shift amount is calculated on the basis of the two reception data previously obtained at scan address 4 and two reception data obtained next at scan address 4. A display scan line for the image display is formed.

An ultrasound beam is transmitted from the ultrasound probe 1 at scan address 7 (●), and ultrasound beams are simultaneously received from the subject at scan addresses 5 (Δ) and 9 (Δ). thereby obtaining reception data at scan addresses 6 (◯) and 8 (◯). This operation is repeated twice, and two reception data at each of scan addresses 6 and 8 are acquired. At this time, a Doppler shift amount is calculated on the basis of the two reception data previously acquired at scan address 6 and the two reception data acquired next at scan address 6. A display scan line for the image display is formed.

The above operations are repeated to obtain Doppler shift amounts at predetermined time intervals, and a highly precise flow velocity distribution image can be displayed.

Figure 6:
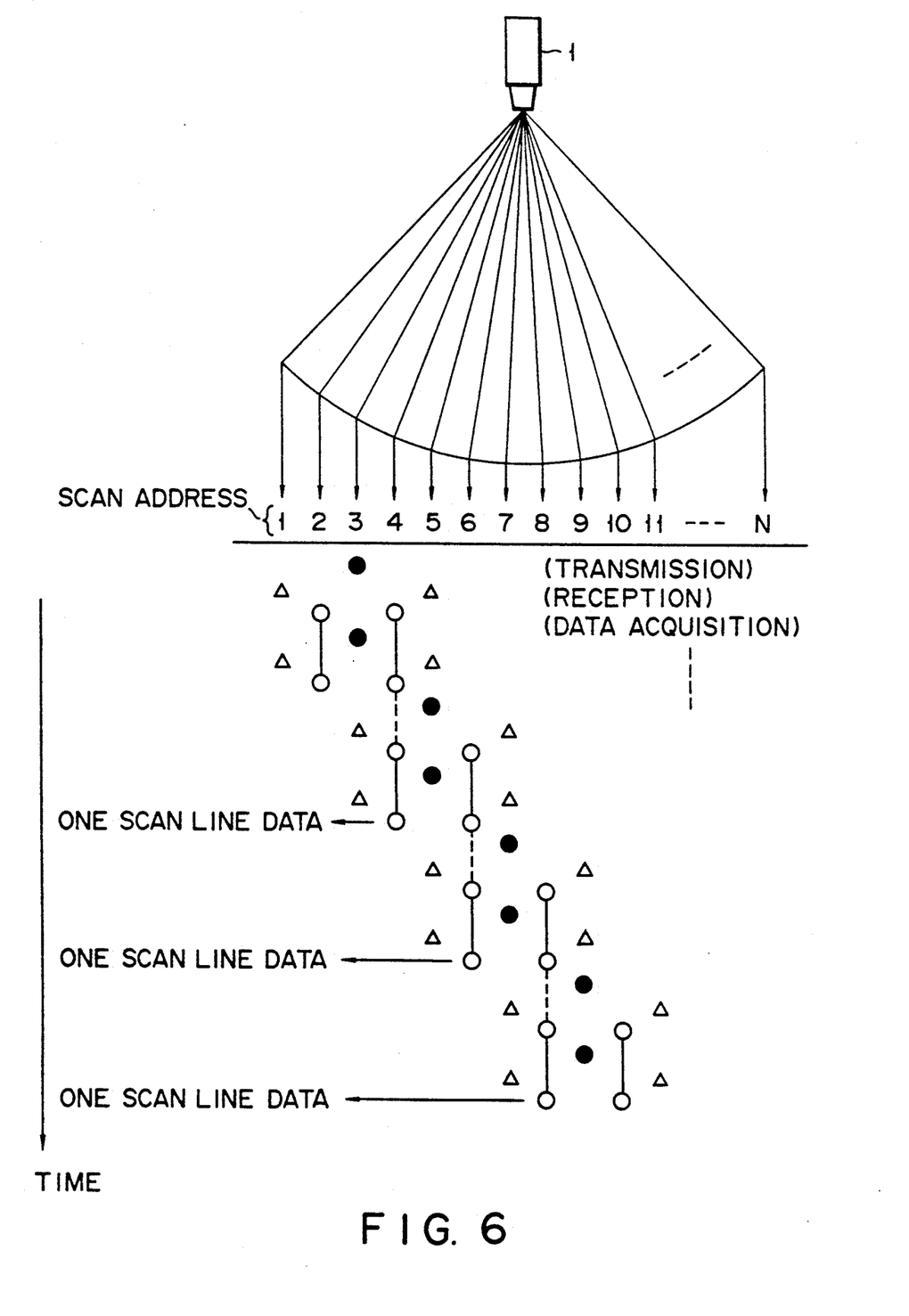
FIG. 6 is a view showing a scan sequence according to the second embodiment of the present invention.

An ultrasound sector scan sequence (ultrasound transmission/reception operation) as the second embodiment of the present invention will be described with reference to FIG. 6. Scan lines are formed between the transmission and reception lines of the ultrasound beam.

An ultrasound beam is transmitted from the ultrasound probe 1 at scan address 3 (●) and ultrasound beams are simultaneously received from the subject at scan addresses 1 (Δ) and 5 (Δ), thereby obtaining reception data at scan addresses 2 (◯) and 4 (◯). This operation is repeated twice to acquire two reception data at each of scan addresses 2 and 4. Doppler shift amounts Db2 and Da4 are calculated on the basis of a pair of two reception data.

An ultrasound beam is transmitted from the ultrasound probe 1 at scan address 5 (●), and ultrasound beams are simultaneously received from the subject at scan addresses 3 (Δ) and 7 (Δ), thereby obtaining reception data at scan addresses 4 (◯) and 6 (◯). This operation is repeated twice to acquire two reception data at each of scan addresses 4 and 6. Doppler shift amounts Db4 and Da6 are calculated on the basis of the pair of these two reception data. At this time, the Doppler shift amount Da4 previously calculated at scan address 4 is added to the Doppler shift amount Db4 calculated next at scan address 4, and the sum is divided by two to obtain an average Doppler shift amount. One display scan line for the image display is formed on the basis of the average Doppler shift amount.

An ultrasound beam is transmitted from the ultrasound probe 1 at scan address 7 (●) and ultrasound beams are simultaneously received from the subject at scan addresses 5 (Δ) and 9 (Δ), thereby obtaining reception data at scan addresses 6 (◯) and 8(◯). This operation is repeated twice to acquire two reception data at each of scan addresses 6 and 8. Doppler shift amounts Db6 and Da8 are calculated on the basis of the pair of two reception data. At this time, the Doppler shift amount Da6 previously calculated at scan address 6 is added to the Doppler shift amount Db6 calculated next at scan address 6, and the sum is divided by two to obtain an average Doppler shift amount. One display scan line for the image display is formed on the basis of the average Doppler shift amount.

The above operations are repeated to obtain Doppler shift amounts at predetermined time intervals. Therefore, a highly precise velocity distribution image can be displayed.

The embodiment exemplifies a sector scan. However, the present invention is also applicable to any other scan such as a linear scan and a convex scan. The reception and transmission directions are not limited to two directions.

The number of reception data in one scan line is not limited to four.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method for controlling an ultrasound scan sequence in a Doppler signal detection, the method comprising the steps of:
    transmitting a first ultrasound beam to a first transmission direction in a subject;
    receiving first echo signals from a plurality of first reception directions at the same time, each of the first echo signals being received from each of the first reception directions;
    obtaining first echo data in a plurality of first scan directions from the received first echo signals, each of the first scan directions being between the first transmission direction and each of the first reception directions;
    transmitting a second ultrasound beam to a second transmission direction in the subject;
    receiving second echo signals from a plurality of second reception directions at the same time, each of the second echo signals being receiving from each of the second reception directions;
    obtaining second echo data in a plurality of second scan directions from the received second echo signals, each of the second scan directions being between the second transmission direction and each of the second reception directions;
    selecting third echo data in one of the first scan directions and fourth echo data in one of the second scan directions corresponding to the one of the first scan directions; and
    acquiring Doppler data from the selected third and fourth echo data.

2. The method according to claim 1, wherein the Doppler data is acquired in a plurality of scan directions corresponding to a desired scan range.

3. The method according to claim 2, further comprising the step of reconstructing a flow velocity distribution image from the acquired Doppler data in the plurality of scan directions.

4. A method for controlling an ultrasound scan sequence in a Doppler signal detection, the method comprising the steps of:
    transmitting a first ultrasound beam to a first transmission direction in a subject;
    receiving first echo signals from a plurality of first reception directions at the same time, each of the first echo signals being received from each of the first reception directions;
    obtaining first echo data in a plurality of first scan directions from the received first echo signals, each of the first scan direction being between the first transmission direction and each of the first reception directions;
    acquiring first Doppler data in one of the first scan direction;
    transmitting a second ultrasound beam to a second transmission direction in the subject;
    receiving second echo signals from a plurality of second reception directions at the same time, each of the second echo signals being received from each of the second reception directions;
    obtaining second echo data in a plurality of second scan directions from the received second echo signals, each of the second scan directions being between the second transmission direction and each of the second reception directions;
    acquiring second Doppler data in one of the second scan directions corresponding to the one of the first scan directions; and
    averaging the first and second Doppler data.

5. The method according to claim 4, wherein the first and second Doppler data are acquired in a plurality of scan directions corresponding to a desired scan range.

6. The method according to claim 5, further comprising the step of reconstructing a flow velocity distribution image from the averaged first and second Doppler data in the plurality of scan directions.

7. A system for controlling an ultrasound scan sequence in a Doppler signal detection, the system comprising:
    transmitting and receiving means for transmitting a plurality of ultrasound beams to a plurality of transmission directions, and receiving a plurality of echo signals from a plurality of reception directions corresponding to each of the transmission directions at the same time, each of the echo signals being received from each of the reception directions;
    data acquiring means for obtaining a plurality of echo data in a plurality of scan directions from the received echo signals by each of the transmission directions, each of the scan directions being between each of the transmission directions and each of the reception directions, acquiring first Doppler data in one of the scan directions corresponding to one of the transmission directions and second Doppler data in the one of the scan directions corresponding to one of the transmission directions outside the one of the transmission directions, and averaging the first and second Doppler data; and
    controlling means for controlling the transmitting and receiving means and the data acquiring means.

8. The system according to claim 7, wherein the first and second Doppler data are acquired in the plurality of scan directions corresponding to a desired scan range.

9. The system according to claim 8, further comprising means for reconstructing a flow velocity distribution image from the averaged first and second Doppler data in the plurality of scan directions.

* * * * *

UNITED STATES PATENT AND TRADEMARK OFFICE
CERTIFICATE OF CORRECTION

PATENT NO. : 5,083,567
DATED : January 28, 1992
INVENTOR(S) : Takanobu Uchibori

It is certified that error appears in the above-identified patent and that said Letters Patent is hereby corrected as shown below:

Abstract, line 3, change "transmision" to --transmission--.

Signed and Sealed this

Fourteenth Day of September, 1993

Attest:

BRUCE LEHMAN

Attesting Officer    Commissioner of Patents and Trademarks